(12) United States Patent
Shankar

(10) Patent No.: US 11,552,959 B2
(45) Date of Patent: Jan. 10, 2023

(54) ACCESS MANAGEMENT SYSTEM WITH A PRE-COMMIT VERIFICATION ENGINE

(71) Applicant: MICROSOFT TECHNOLOGY LICENSING, LLC, Redmond, WA (US)

(72) Inventor: Chetan Shankar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 228 days.

(21) Appl. No.: 16/458,169

(22) Filed: Jun. 30, 2019

(65) Prior Publication Data

US 2020/0412741 A1    Dec. 31, 2020

(51) Int. Cl.
    *H04L 9/40*        (2022.01)
(52) U.S. Cl.
    CPC ............ *H04L 63/123* (2013.01); *H04L 63/20* (2013.01)
(58) Field of Classification Search
    CPC ....... H04L 63/123; H04L 63/20; H04L 63/10; G06F 2221/034; G06F 21/6218; G06F 21/604
    See application file for complete search history.

(56) References Cited

U.S. PATENT DOCUMENTS

| | | | |
|---|---|---|---|
| 9,313,230 B1 | 4/2016 | Kruse et al. | |
| 10,263,995 B1 | 4/2019 | Kruse et al. | |
| 10,454,975 B1 * | 10/2019 | Sharifi Mehr | H04L 63/08 |
| 10,680,958 B2 * | 6/2020 | Guan | H04L 47/20 |
| 2005/0222996 A1 * | 10/2005 | Yalamanchi | G06F 16/25 |
| 2007/0124797 A1 * | 5/2007 | Gupta | H04L 63/102 726/1 |
| 2009/0288135 A1 | 11/2009 | Chang et al. | |
| 2016/0330241 A1 * | 11/2016 | Olivera | H04L 63/20 |
| 2018/0069899 A1 | 3/2018 | Lang et al. | |

OTHER PUBLICATIONS

"International Search Report & Written Opinion issued in PCT Application No. PCT/US20/031970", dated Jul. 28, 2020, 13 Pages.

* cited by examiner

*Primary Examiner* — Michael R Vaughan
(74) *Attorney, Agent, or Firm* — Shook, Hardy & Bacon L.L.P.

(57) ABSTRACT

Methods, systems, and computer storage media for providing resource policy management based on a pre-commit verification engine are provided. Pre-commit verification operations are executed to simulate committing a policy, in a distributed computing environment, for test request instances, without actually committing the policy. In operation, a policy author communicates a policy and one or more test request instances. Based on the policy and the test request instances, an access control manager simulates committing the policy for the test request instances to the computing environment. Simulating committing the policy for test request instances is based on an existing set of policies including a live version of the policy and contextual information corresponding to the policy and the test request instances for the computing environment in which the policy will be applied. Based on simulating committing the policy without committing the policy, policy verification results for the policy are generated and communicated.

20 Claims, 7 Drawing Sheets

ACCESS MANAGEMENT SYSTEM WITH A PRE-COMMIT VERIFICATION ENGINE

BACKGROUND

Users often rely on computing resources such as applications and services to perform various computing tasks. Distributed computing environments can support building, deploying, and managing applications and services. Users and enterprises are moving away from traditional computing environments to run their applications and services on distributed computing environments. Distributed computing environments implement security mechanisms (e.g., access management systems) to ensure the security of different types of computing resources in the distributed computing environments. As distributed computing environments increasingly support applications and services, providing both improved secure provisioning of access to computing resources and data security in distributed computing environments is important.

SUMMARY

Various aspects of the technology described herein are generally directed to systems, methods, and computer storage media for, among other things, providing resource policy management for an access management system in a distributed computing environment ("computing environment") based on a pre-commit verification engine. In particular, a pre-commit verification engine provides pre-commit verification operations that are executed to simulate committing a policy in a computing environment for one or more test request instances without actually committing the policy. Simulating committing the policy is based on an existing set of policies in the access management system (e.g., access control manager that provides temporary access to a resource instance) and contextual information corresponding to the policy and one or more test request instances for a computing environment in which the policy will be applied. Based on simulating committing the policy without committing the policy, policy verification results are generated and communicated. In this regard, the resource policy management system allows a policy author to manage (e.g., create, update, control, delete, and verify) a policy while limiting unknown, unnecessary, and unexpected impact to the distributed computing environment.

By way of background, an access management system can include access control manager (e.g., Just-In-Time "JIT" system) that supports a set of policies. Policies may be updated to comply with internal or external resource requirements. Modifications to policies can raise challenges in computing environments that support a large number of resource instances. In particular, when a service team (e.g., policy author) modifies a policy by changing one of the attributes of the policy, current access management systems lack the capacity for a service team to verify whether the updated policy will operate as intended.

Conventional access management systems lack an adequate policy verification model in that current policy verification operations include high-touch (expensive) human and computing resources; and they include a high risk of exposure of a possibly deficient policy to the "production" computing environment. For example, the current policy verification operations are expensive because at least two administrators (e.g., policy author and requester) are usually involved in verifying the policy. In addition, if a bug exists in the policy the updates to the policy have already been committed to the access control manager. It is not uncommon that an unverified policy is committed that breaks users' access to different resources. As such, an alternative approach for providing an access management system that can provide strategic safeguarded policy verification operations would improve computing operations for more secure and efficient policy management operations.

Aspects of the technical solution described in the present disclosure are directed towards improving resource policy management in an access management system of a distributed computing environment ("computing environment") based on a pre-commit verification engine that provides pre-commit verification operations that are executed to simulate committing a policy in a computing environment for a test request instance without actually committing the policy. Simulating committing the policy includes retrieving contextual information (e.g., security groups a user is a member of, and user account name) corresponding to the policy and a test request instance, and evaluating the policy against an existing set of policies in sequence without applying policy evaluation results to the computing environment, the existing set of policies are in the access management system associated with the computing environment. Based on simulating committing the policy without committing the policy, the policy verification results are generated for the policy and communicated. As such, resource policy management provides a safe and secure policy verification mechanism which allows a policy author to understand the impact of a policy, while limiting unexpected results of the policy on the computing environment.

In operation, a policy author communicates a policy and one or more test request instances for the policy to an access control manager, the policy includes a new parameter not yet tested in the computing environment. Based on the policy and the one or more test request instances, the access control manager simulates committing the policy to the computing environment. Simulating the policy is based on the one or more test request instances, where simulating the policy includes: accessing, from the computing environment, contextual information for the policy and the one or more test instances; accessing a set of policies; updating a live version of the policy in the set of polices with the new parameter; and evaluating the one or more test request instances against the set of policies in sequence (including a live version of the policy having the new parameter) without applying policy evaluation results to the computing environment. Evaluating the policy can be based on the individual policy instances (e.g., "if-then" condition-action rules) in the policy. Based on simulating committing the policy without committing the policy, the policy verification results are generated for the policy and the one or more test request instances. The policy verification results are communicated to the policy author. The policy verification results can indicate that the policy should be auto-denied, auto-approved, or manually approved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
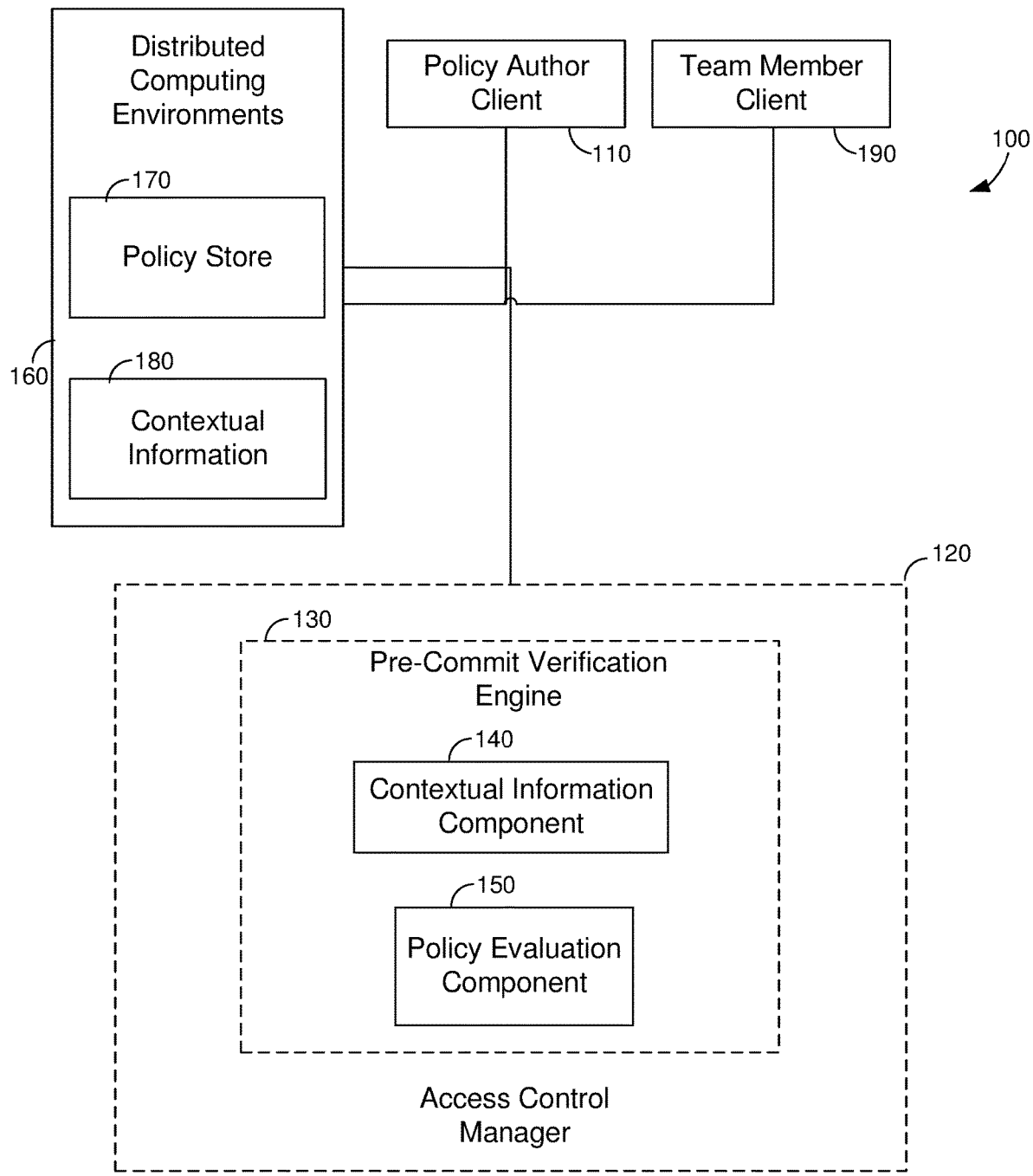
FIG. 1 is a block diagram of an exemplary access management environment for providing resource policy management operations using a pre-commit verification engine, suitable for use in implementing aspects of the technology described herein.

Overview of Aspects of the Technological Improvement

Distributed computing environments implement security mechanisms (e.g., access management systems) to ensure the security of different types of computing resources (e.g., computing access and secure user data) in the distributed computing environments. An access management system can include an access control manager that supports a set of policies. In particular, the access control manager (e.g., Just-In-Time "JIT" system) can be a limited-timed access provisioning mechanism that provides temporary access to requesters to resources based on security policies.

By way of background, when a request is submitted to the access control manager, the request is evaluated against an existing set of policies (e.g., applicable rules) in sequence and the results of the last matching action are taken to be the result of the policy evaluation. The result can include granting access to a resource instance with or without human approval or automatically denying the request. The access control manager can apply the result when an access is granted and monitors the access and revokes access when the temporary time period expires. Policies may be updated to comply with internal or external resource requirements. Modifications to policies can raise challenges in computing environments. In particular, when a service team (e.g., policy author) modifies a policy by changing one of the attributes, current access management systems lack the capacity for a service team to verify whether the updated policy will operate as intended.

By way of example, a policy author may update a policy and verify the updated policy. In particular, when a policy is modified, the verification of the correctness of the change involves committing the policy to the (production) access control manager of the computing environment intended to use the policy. The expectation at times is for the policy author to verify that the policy operates in the manner in which the policy was intended. On the one hand, static verification of a policy is not possible because the policy has to be evaluated based on the runtime state of the computing environment and as part of a larger policy set in the computing environment. On the other hand, committing the policy changes to the access control manager when the policy is untested has the disadvantage that a wrong policy change can impact the operational or security features of a service team associated with the policy.

Conventional access management systems lack an adequate policy verification model in that current verification operations include high touch (expensive) human and computing resources and also high risk of exposure of a possibly deficient policy to the production environment. By way of context, a policy can be configured as a condition-action (if-then) format policy, the if-then policy can include parameters that include a set of conditions that have to be met to perform another action (e.g., approve, deny, escalate) for the corresponding access request to a resource. For example, if a user is a member of a security group and the user is requesting access to a virtual machine, with request access rights level being administrator level, then approve.

Modifications to policies can raise challenges in computing environments. For example, with reference to the previous example policy, the access rights level is updated from "administrator" to "power user." Currently, no mechanism exists to determine (in advance of implementing the policy in a live production environment) the impact of this update to the distributed computing environment or on the requesting administrator. Conventional access management systems have policy provisioning operations that include pushing the policy to an access control manager of a live production environment, and then the policy is tested in the live production environment. For example, a test user may request access based on the policy to verify that the policy operates correctly. The current verification operations are expensive because at least two administrators (e.g., author and test user) are usually involved in verifying the policy. In addition, if a bug exists in the policy, the updates to the policy are already committed. It is not uncommon that an unverified policy is committed that breaks users' access to different resources. Moreover, verification involves access granting and revocations, which leads to unnecessary elevations. As such, an alternative approach for providing a resource policy management that can provide strategic and safeguarded policy verification operations would improve computing operations for more secure and efficient policy management operations.

Embodiments of the present invention are directed to simple and efficient methods, systems, and computer storage media for providing resource policy management in an access management system of a distributed computing environment ("computing environment") based on a pre-commit verification engine that provides pre-commit verification operations that are executed to simulate committing a policy in a computing environment for a test request instance without actually committing the policy.

Figure 2:
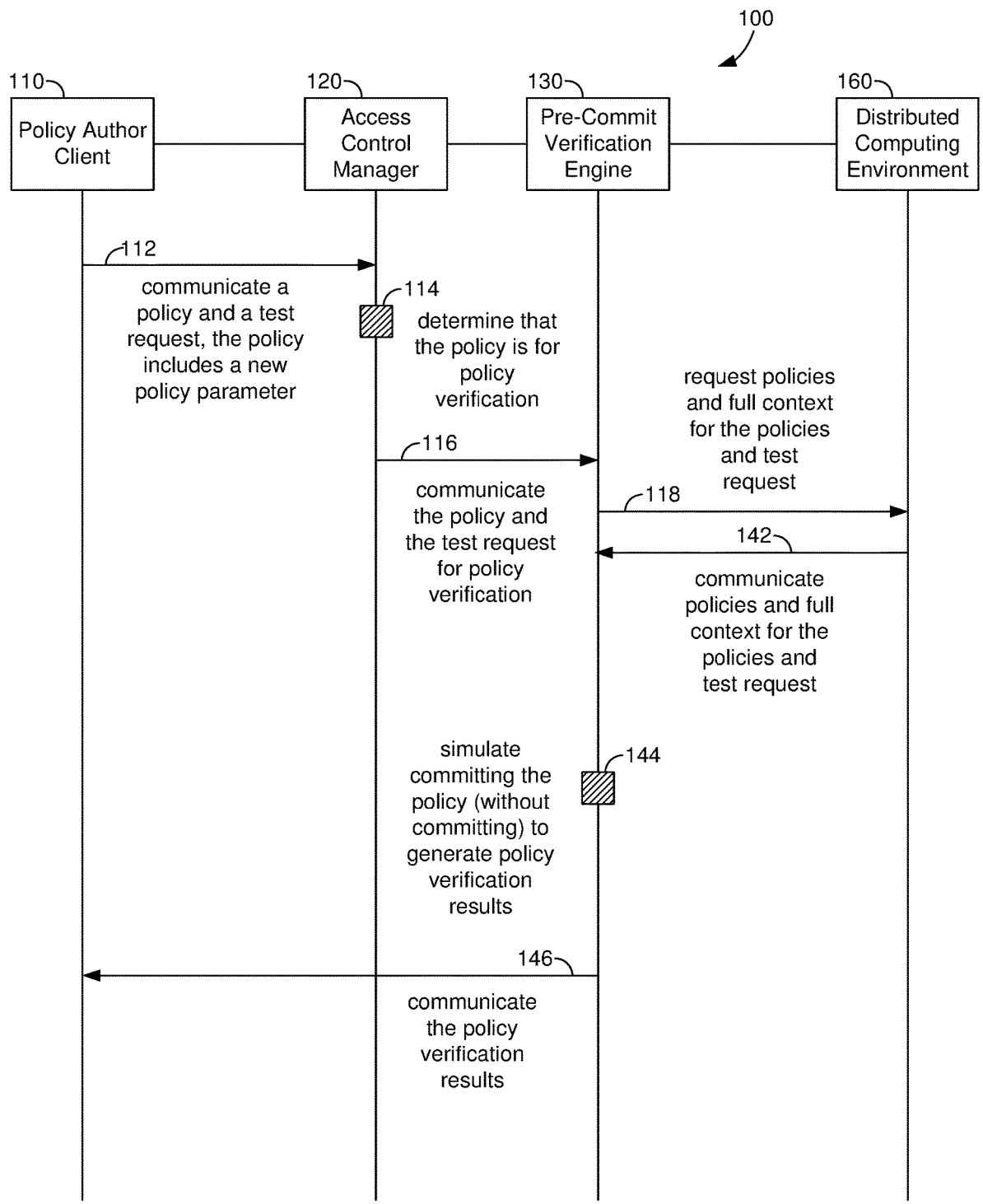
FIG. 2 is an exemplary access management environment for providing resource policy management operations using a pre-commit verification engine in accordance with aspects of the technology described herein.

Overview of Example Environments for Providing Resource Policy Management Using a Pre-Commit Verification Engine Aspects of the technical solution can be described by way of examples and with reference to FIG. 1 and FIG. 2. FIG. 1 and FIG. 2 are associated with an exemplary technical solution environment (access management environment 100) suitable for use in implementing embodiment of the technical solution. Generally the technical solution environment includes a technical solution system suitable for providing resource policy management using a pre-commit verification engine. With initial reference to FIG. 1, FIG. 1 discloses access management environment 100 having policy author client 110, access control manager 120, pre-commit verification engine 130, contextual information component 140, policy evaluation component 150, distributed computing environments 160, policy store 170, context information 180, and team member client 190.

At a high level, an access control manager (e.g., access control manager 120) supports performing pre-commit verification operations that simulate committing a policy without committing the policy to generate policy verification results. A policy author may use a policy configuration manager service to create or update a policy. The policy includes new parameters that should be committed to access the control manager (and distributed computing environment).

It is important to note that when simulating committing the policy, the policy is not yet committed to the access control manager; however, the policy can be associated with a test request (e.g., test user's policy parameter values). The test request parameter values can be determined from context information in the distributed computing environment. In other words, the access management system has access to test user profile parameter values to identify the set of values that are relevant for evaluating the policy. For example, it can be determined that the test administrator is a member of a security group, has a given alias, and a set of resources the test user supports.

The policy author can communicate the policy (having the new parameters) and the one or more test request instances to the pre-commit verification engine of the access control manager. The pre-commit verification engine is configured to execute pre-commit verification operations that include simulating committing the policy without actually committing the policy. Based on the policy and the test request instances, the access control manager executes pre-commit verifications operation using the pre-commit verification engine to simulate committing the policy to the computing environment.

The pre-commit verification engine operates to access, from the computing environment, contextual information for the policy and the one or more test instances. The policy is a policy instance in the set of policies, where the set of policies are an ordered sequence of condition-action rules that are evaluated in sequence such that a last matching action is identified as a result of an evaluation of the policy. The test request instances include parameters associated with parameters of the policy, where the contextual information for the test requests are determined based on the parameters.

The access control manager determines the contextual information using the context information component 140. The contextual information can be (real-time) full context of the test request instances (i.e., user security groups, presence

TABLE 1

| Policy Name | Conditions | Actions |
|---|---|---|
| P1 | Requester is a member of any of the following Security Groups(s): TEAM-SecurityGroup AND Vmss.Name Equals TestVm AND Environment is one of NonProduction | Include the following message to the requester upon approval: Team is requesting access to TEST VMSS instance Grant access to the following duration: 8 hours Stop Processing Additional Policies true |
| P2 | Requester is a member of any of the following Security Groups(s): TEAM-OperatorGroup AND Vmss.ResourceGroupName StringEquals InternGroup | Require approval from a member of the following security groups(s): TEAM-AdminGroup Include the following message to the requestor upon approval: testing Grant access to the following duration: 4 hours Stop Processing Additional Policies true |
| P3 | Requester is a member of any of the following Security Group(s): TEAM-Group AND Vmss.ResourceGroupName StringEquals ResearchGroup | Grant access for the following duration: 4 hours Stop Processing Additional Policies true |

With reference to Table 1, a policy author can make a change to policy (e.g., new parameter). The policy author may update the policy to make the highlighted changes (i.e., TEAM-OperatorGroup, InternGroup, and TEAM-AdminGroup of P2). The policy author can then prepare one or more test requests (e.g., test request instances) associated with the policy.

Test Request Instance 1: if user Joe (who is a member of TEAM-SecurityGroup) requests access to TestVm as an administrator, auto-approve request;

Test Request Instance 2: if user Sally (who is a member of TEAM-OperatorGroup, but not TEAM-SecurityGroup) requests access to Vmss in InternGroup resource group, send for manual approval, and only grant access for 4 hours;

Test Request Instance 3: if user Joanna (who is a member of TEAM-OperatorGroup, and also TEAM-SecurityGroup) requests access to TestVm as an Administrator, auto-approve request.

of the resources being requested, ownership) that is required to evaluate each of the test request instances.

Simulating the policy is based on the one or more test request instances, where simulating the policy includes accessing the set of policies having a live version of the policy. Accessing the set of policies can include snapshotting the set of policies from a policy store and accessing the snapshot of the set of policies in-memory to preclude committing the live version of the policy with the new parameter. The pre-commit verification engine applies the new parameter of the policy to the live version of the policy in the set of policies, where applying the new parameter precludes committing the new parameter. The one or more test requests are then evaluated against the set of policies having the live version of the policy having the new parameter.

By way of example, accessing the set of polices can include taking a snapshot of the current policy set {P1, P2, P3} and applying the changes to existing policy P2 (P2') but not committing the changes. In this regard, no other requesters (requests to the access control manager) are impacted. The pre-commit verification engine evaluates the policy and the one or more test request instances against the set of policies in sequence without applying policy evaluation results to the computing environment. For example, the access control manager runs the test request instances against the policy set {P1, P2', P3}

Evaluating the policy can be based on the individual policy instances (e.g., "if-then" condition-action rules) in the policy. Based on simulating committing the policy without committing the policy, the policy verification results are generated for the policy and the one or more test request instances. The policy verification results are communicated to the policy author. The policy verification results include one of the following: a first value to automatically deny the policy; a second value to automatically approve the policy; and a third value to manually approval the policy.

With reference to FIG. 2, FIG. 2 also discloses the access management environment 100 with policy author client 110, access control manager 120, pre-commit verification engine 130, and distributed computing environment 160. Initially at step 112, a policy author (e.g., via the policy author client 110) communicates a policy and test request. The policy includes a new parameter. The policy is communicated to the access control manager 120. At step 114, the access control manager 120 makes a determination whether the policy is verified and/or unverified for a computing environment where the policy will be applied. It is contemplated that several different types of tags, triggers, or identifiers may be used to determine whether the policy has been verified. In one example, the policy having a test request associated with the policy is an indicator that the policy is unverified and a pre-commit verification operation should be performed.

At step 116, the access control manager 120 communicates the policy and the test request for policy verification. The policy and the test request are communicated at step 116 from the access control manager 120 to pre-commit verification engine 130, the pre-commit verification engine 139 then requests 118 a set of policies and a full context (e.g., real-time contextual information) from the distributed computing environment 160 having the policy store and the full context for the policy and the test request. The distributed computing environment 160, at step 142, communicate the set of policies and the full context for the policies and the test request. The set of policies include a live version of the policy having the new parameter. At step 144, the pre-commit verification engine 130 simulates committing the policy without committing the policy to generated policy verification results.

Simulating committing the policy without committing the policy is based on applying the new parameter of the policy to the live version of the policy in the set of policies, where applying the new parameter precludes committing the new parameter and evaluating the one or more test requests against the set of policies comprising the live version of the policy having the new parameter. At step 146, the pre-commit verification engine 130 communicates the policy verification results. The policy verification results may include one of the following: a first value to automatically deny the policy; a second value to automatically approve the policy; and a third value to manually approve the policy. Advantageously, the pre-commit verification operations allow a policy author to verify changes to a policy without expensive human or computing resources. Policy changes are proactively verified before submission so the access management system is not impacted. Moreover, as no access is granted or revoked unnecessarily during the testing process, the verification process is safe and does not lead to unwanted grants of access.

Aspects of the technical solution of this disclosure have been described with reference to several inventive features and advantages associated with resource policy management based on pre-commit verification operations. In particular, the pre-commit verification operations of the resource policy management system provide a safe and secure policy verification mechanism which allows a policy author to understand the impact of a policy, while limiting unexpected results of the policy on the computing environment. Overall, a practical application of aspects of the technical solution described results in improvements based on less CPU computation, smaller memory requirements, and increased flexibility in file systems.

Figure 3:
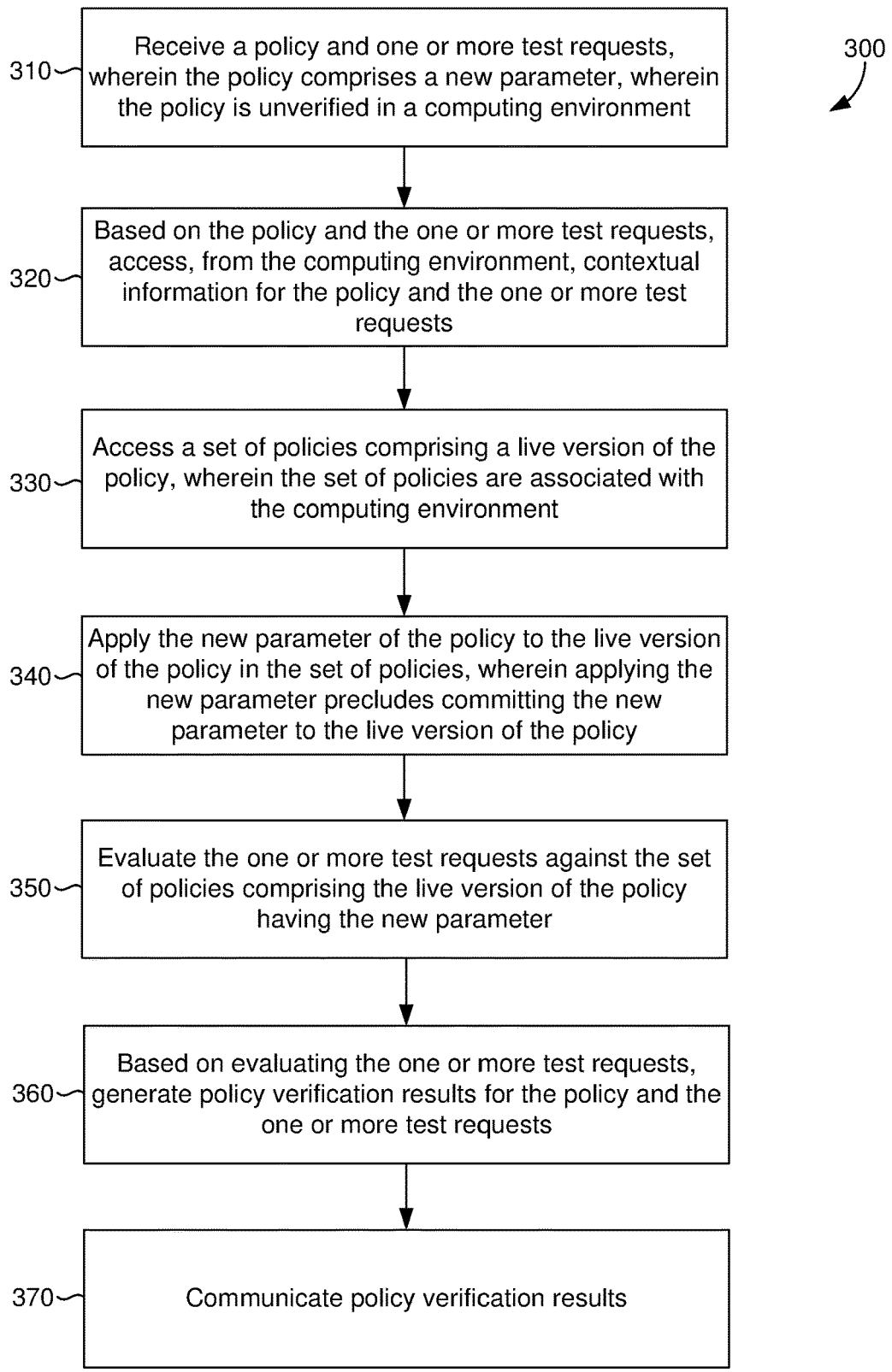
FIG. 3 provides a first exemplary method of providing resource policy management operations using a pre-commit verification engine in accordance with aspects of the technology described herein.
Figure 4:
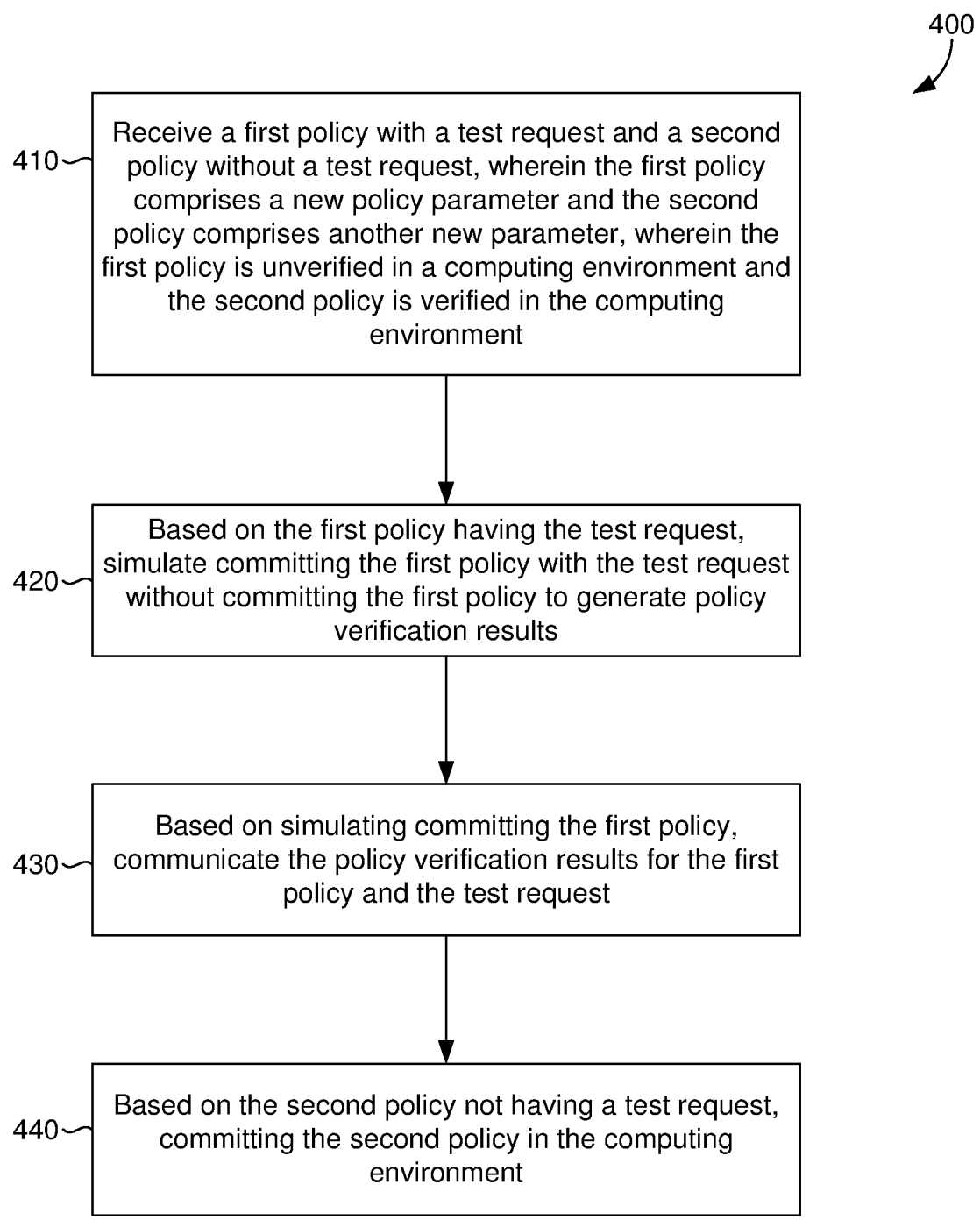
FIG. 4 provides a second exemplary method of providing resource policy management operations using a pre-commit verification engine, in accordance with aspects of the technology described herein.
Figure 5:
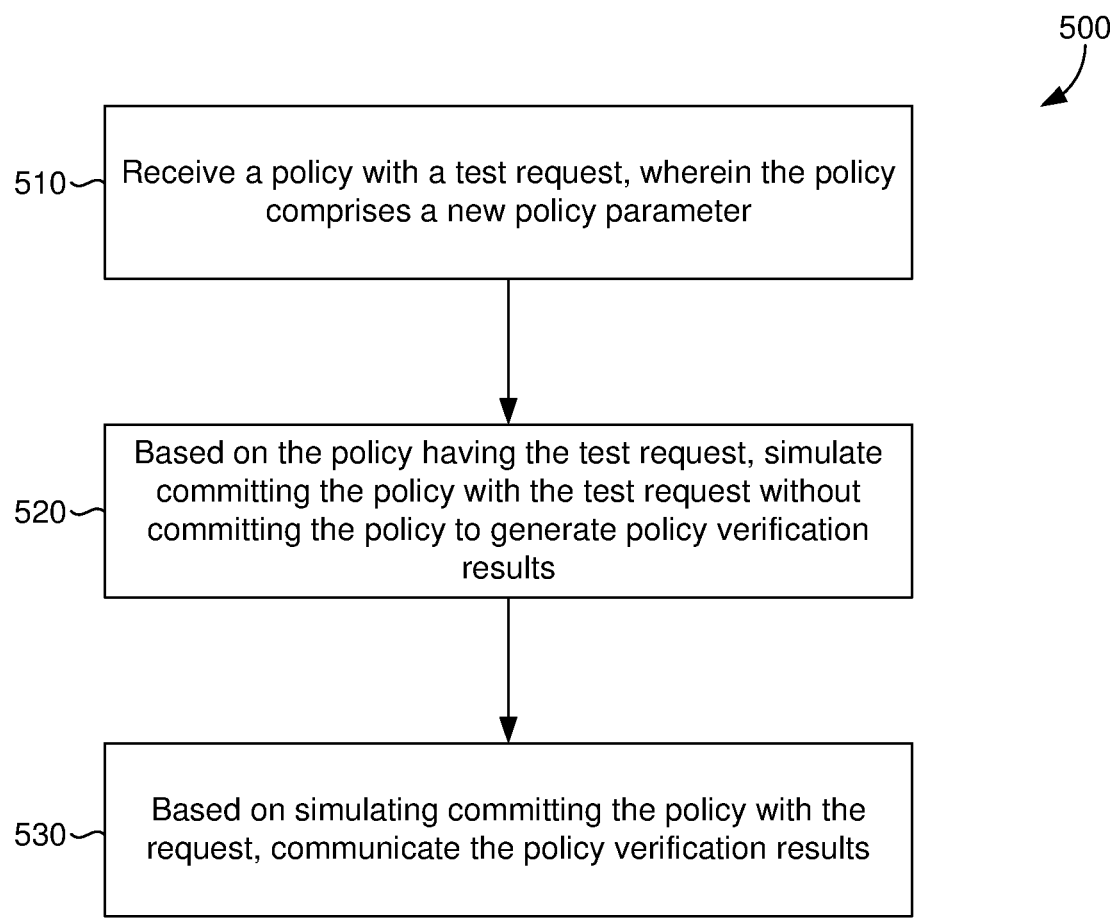
FIG. 5 provides a third exemplary method of providing resource policy management operations using a pre-commit verification engine, in accordance with aspects of the technology described herein.

Exemplary Methods for Providing Resource Policy Management Using a Pre-Commit Verification Engine With reference to FIGS. 3, 4, and 5, flow diagrams are provided illustrating methods for providing resource policy management using a pre-commit verification engine. The methods may be performed using the access management environment described herein. In embodiments, one or more computer storage media having computer-executable instructions embodied thereon that, when executed by one or more processors, can cause the one or more processors to perform methods in the access management environment.

Turning to FIG. 3, a flow diagram is provided that illustrates a method 300 for providing resource policy management using a pre-commit verification engine. Initially at block 310, a policy and one or more test requests are received. The policy comprises a new parameter. The policy is unverified in a computing environment. At block 320, based on the policy and the one or more test requests, contextual information for the policy and the one or more test requests is accessed from a computing environment. At block 330, a set of policies comprising a live version of the policy is accessed. The set of policies are associated with the computing environment. At block 340, the new parameter of the policy is applied to the live version of the policy in the set of policies. Applying the new parameter precludes committing the new parameter to the live version of the policy. At block 350, the one or more test requests are evaluated against the set of policies comprising the live version of the policy having the new parameter. At block 360, based on evaluating the one or more test requests, policy verification results for the policy and the one or more test requests are generated. At block 370, the policy verification results are communicated.

Turning to FIG. 4, a flow diagram is provided that illustrates a method 400 for providing resource policy management using a pre-commit verification engine. Initially at block 410, a first policy with a test request and a second policy without a test request are received. The first policy comprises a new parameter and the second policy comprises another new parameter. The first policy is unverified in a computing environment and the second policy is verified in the computing environment. At block 420, based on the first policy having the test request, simulating committing the first policy with the test request without committing the first policy to generate policy verification results. At block 430, based on simulating committing the first policy, the policy verification results for the first policy and the test request are communicated. At block 440, based on the second policy not having a test quest, the second policy is committed in the computing environment.

Turning to FIG. 5, a flow diagram is provided that illustrates a method 500 providing resource policy management using a pre-commit verification engine. Initially at block 510, a policy with a test request is received. The policy comprises a new parameter. At block 520, based on the policy having the test request, committing the policy with the test request is simulated without committing the policy to generate policy verification results. At block 530, based on simulating committing the policy with the request, the policy verification results are communicated.

Example Access Management System

Figure 6:
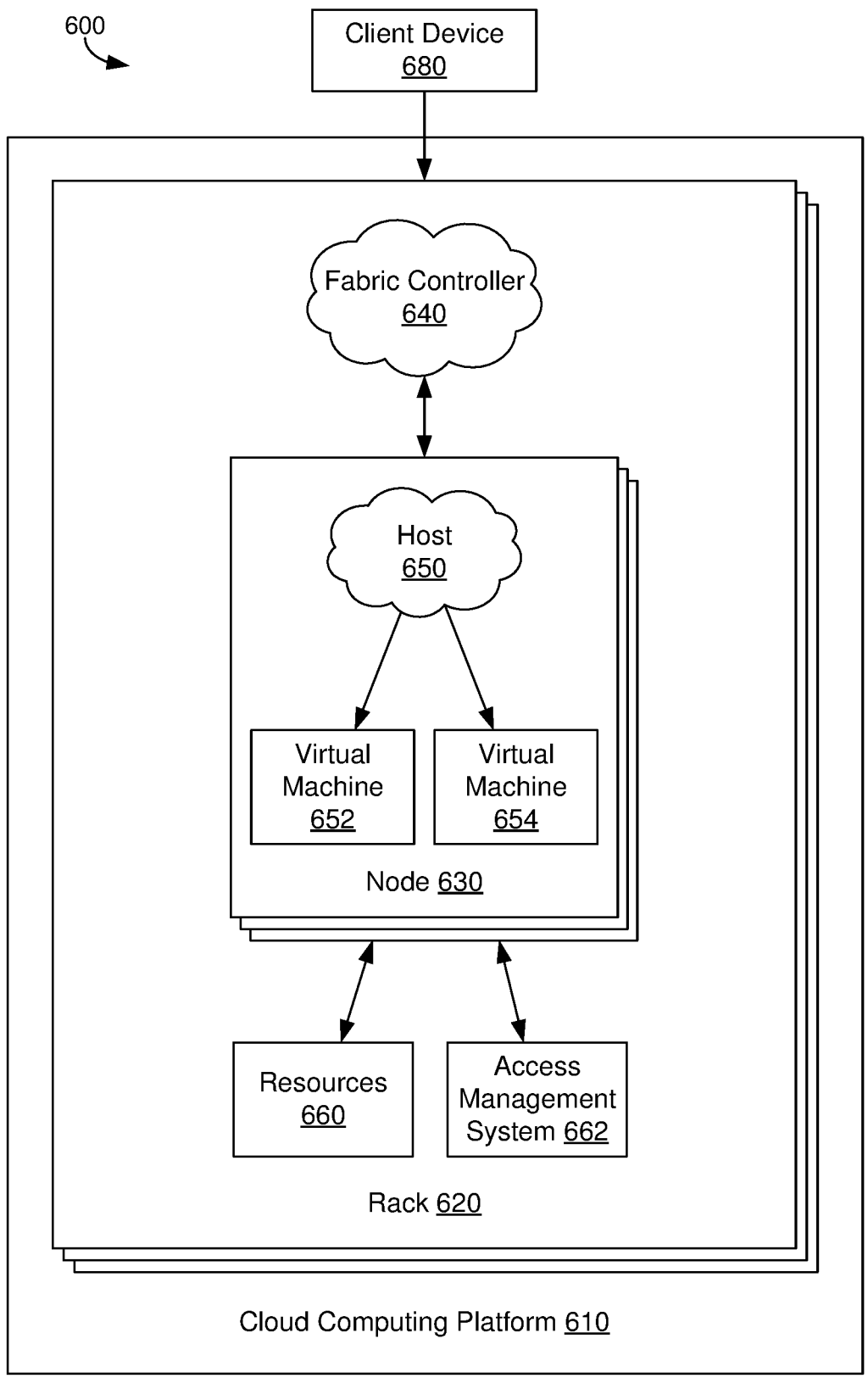
FIG. 6 provides a block diagram of an exemplary distributed computing environment suitable for use in implementing aspects of the technology described herein.

With initial reference the access management system 662 of FIG. 6, at a high level, access management (or access control) can refer to computing security processes and components that provide computer security based on identification, authorization, authentication, access approval, and auditing. An access management system can be implemented in a distributed computing environment to limit access to distributed computing environment resources. The access management system can be specifically implemented as a time-limited controlled access management system (e.g., Just-In-Time "JIT" service). By way of example, a Just-in-Time access management system can be a context-based access management system that provides temporary access to requesters to resources based on security policies. These policies can be designed as an ordered sequence of condition-action rules. When a request is submitted, it is evaluated against applicable rules in sequence and the results of the last matching action are taken to be the result of the policy evaluation. The result involves granting access to a resource with or without human approval or automatically denying the request. The JIT system applies the result and when an access request is granted, the JIT system monitors the access and once it expires the access is revoked.

Time-limited controlled access can advantageously be used to lock down inbound traffic to virtual machines to reduce exposure to attacks, while providing easy access to virtual machines when needed. By way of example, when access management is enabled for a resource (e.g., VM), an access management system 662 can lock down inbound traffic to the resource by creating a network security group (NSG) rule. The resource, for example, may be a VM and selected ports are locked down and controlled using the access management system 662. As such, when a user requests access to a VM, the access management system 662 (e.g., a security center) checks that the user has a role-based access control permission that permits the user to successfully request to access the VM. If the request is approved, the security center can automatically configure a network security group (e.g., NSG) to allow inbound traffic to a selected port and requested source IP addresses or ranges, for the amount of time that was specified. After the time has expired, the security center restores the NSGs to previous states, while keeping the connections that are already established uninterrupted.

The access management system can support different types of policies for controlling access to resources. A VM can be configured to operate with a selected policy or group of policies. In an example implementation, when a VM is enabled for access management, the access management system 662 can create a "deny all inbound traffic" for selected ports; however, other manual port settings can also be configured. When requesting access to a VM, a user may identify the ports that the user wants to open, the source IP addresses that the port is opened on, and the time window for which the port will be open. The access management system 662 may support requesting access to the ports that are configured in the policy. It is contemplated that each port may have a maximum allowed time derived from the policy.

The access management system 662 can further support auditing access activity by way of a log search. Permissions can be configured to limit access to configuring and use of the access management system 662. The access management system 662 can also optionally be configured programmatically. For example, representational state transfer (REST) APIs can be used to programmatically get information about configured VMs, add new ones, request access to a VM, and more.

Example Distributed Computing Environment

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller component 640 for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service application. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and computing device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610 and an access management system 662 (e.g., access control manager). It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but expose as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Operating Environment

Figure 7:
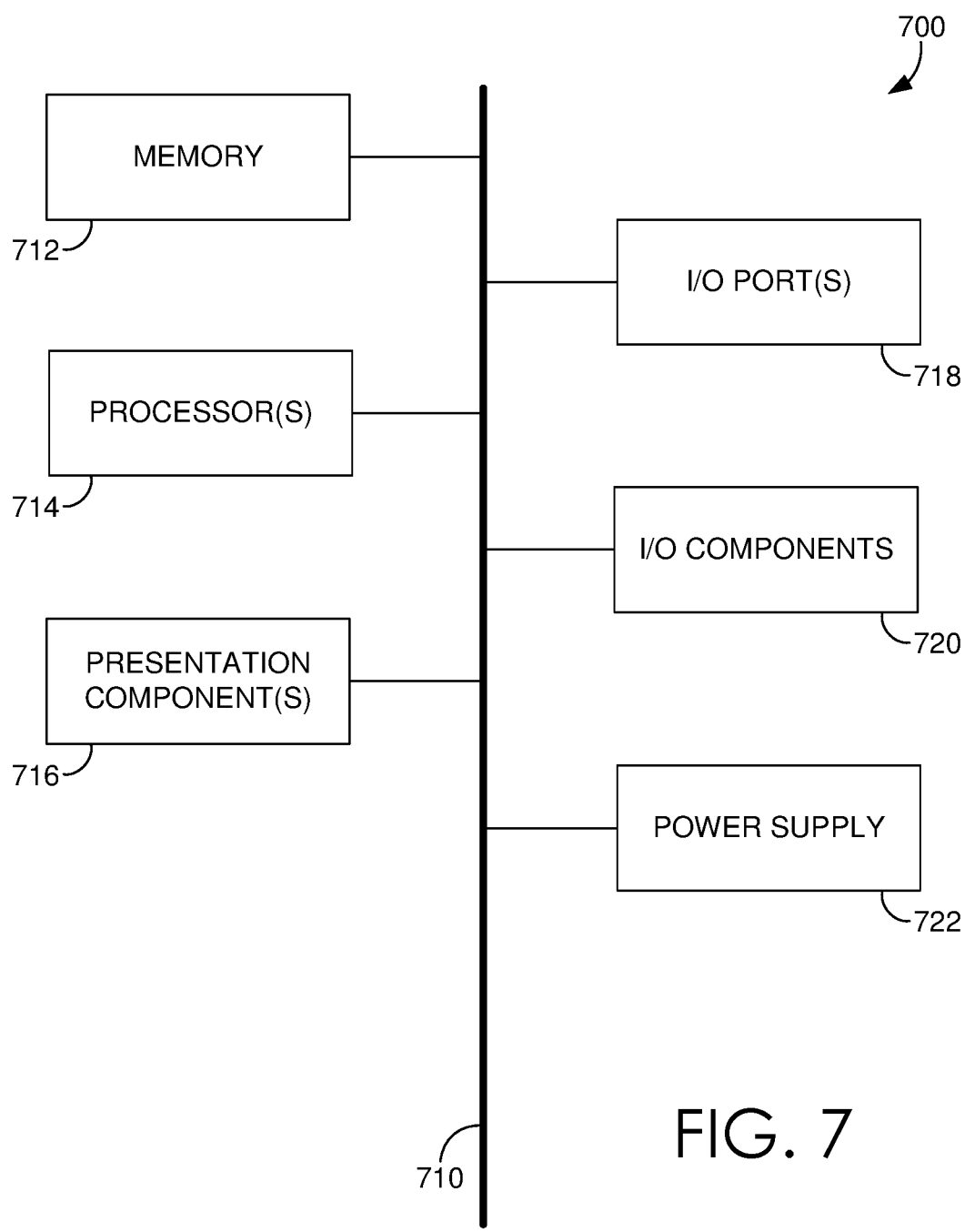
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables that may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. An access management system for providing resource policy management using a pre-commit verification engine, the system comprising:
   one or more processors; and
   one or more computer storage media storing computer-useable instructions that, when used by the one or more processors, cause the one or more processors to execute:
   receiving, at an access control manager, a policy and one or more test requests, wherein the policy is associated with a user and comprises a new parameter, wherein the policy is an access policy that is unverified in a computing environment;
   based on the policy and the one or more test requests, accessing, from the computing environment, contextual information for the policy and the one or more test requests, wherein the contextual information comprises one or more security groups and user profile parameters associated with the user;

accessing a set of policies comprising a live version of the policy, wherein the set of policies are an in-memory snapshot of a stored set of policies in a policy store associated with the computing environment, wherein the set of policies are an ordered sequence of condition-action rules that are evaluated in sequence to provide the user approved access to the computing environment;

applying the new parameter of the policy to the live version of the policy in the set of policies in the in-memory snapshot, wherein applying the new parameter via the in-memory snapshot precludes committing the new parameter of the policy to the stored set of policies in the policy store, evaluating the one or more test requests against the set of policies comprising the live version of the policy having the new parameter;

based on evaluating the live versions of the policy, generating policy verification results for the policy and the one or more test requests; and communicating the policy verification results.

2. The system of claim 1, wherein the policy is a policy instance in the set of policies, wherein the set of policies are the ordered sequence of condition-action rules that are evaluated in sequence such that a last matching action is identified as a result of an evaluation of the policy.

3. The system of claim 1, wherein the test requests comprise parameters associated with parameters of the policy, wherein the contextual information for the test requests are determined based on the parameters.

4. The system of claim 1, wherein accessing the set of policies comprises snapshotting the set of policies from the policy store.

5. The system of claim 1, wherein the in-memory snapshot of the stored set of policies in a policy store supports precluding committing to the policy store the live version of the policy having the new parameter.

6. The system of claim 1, further comprising committing a first policy, wherein the first policy is not communicated with a test request; and simulating committing a second policy, wherein the second policy is communicated with a test request.

7. The system of claim 1, wherein the policy verification results include one of the following:
a first value to automatically deny the policy;
a second value to automatically approve the policy; and
a third value to manually approve the policy.

8. One or more computer storage media having computer-executable instructions embodied thereon that, when executed by one or more processors, cause the one or more processors for providing resource policy management using a pre-commit verification engine, the method comprising:

receiving, at an access control manager, a policy and one or more test requests, wherein the policy is associated with a user and comprises a new parameter, wherein the policy is an access policy that is unverified in a computing environment;

based on the policy and the one or more test requests, accessing, from the computing environment, contextual information for the policy and the one or more test requests, wherein the contextual information comprises one or more security groups and user profile parameters associated with the user;

accessing a set of policies comprising a live version of the policy, wherein the set of policies are an in-memory snapshot of a stored set of policies in a policy store associated with the computing environment, wherein the set of policies are an ordered sequence of condition-action rules that are evaluated in sequence to provide the user approved access to the computing environment;

applying the new parameter of the policy to the live version of the policy in the set of policies in the in-memory snapshot, wherein applying the new parameter via the in-memory snapshot precludes committing the new parameter of the policy to the stored set of policies in the policy store, evaluating the one or more test requests against the set of policies comprising the live version of the policy having the new parameter;

based on evaluating the live versions of the policy, generating policy verification results for the policy and the one or more test requests; and communicating the policy verification results.

9. The media of claim 8, wherein the policy is a policy instance in the set of policies, wherein the set of policies are the ordered sequence of condition-action rules that are evaluated in sequence such that a last matching action is identified as a result of an evaluation of the policy.

10. The media of claim 8, wherein the test requests comprise parameters associated with parameters of the policy, wherein the contextual information for the test requests are determined based on the parameters.

11. The media of claim 8, wherein accessing the set of policies comprises snapshotting the set of policies from the policy store.

12. The media of claim 8, wherein the in-memory snapshot of the stored set of policies in a policy store supports precluding committing to the policy store the live version of the policy having the new parameter.

13. The media of claim 8, the method further comprising committing a first policy, wherein the first policy is not communicated with a test request; and simulating committing a second policy, wherein the second policy is communicated with a test request.

14. The media of claim 8, wherein the policy verification results include one of the following:
a first value to automatically deny the policy;
a second value to automatically approve the policy; and
a third value to manually approve the policy.

15. A computer-implemented method for providing resource policy management using a pre-commit verification engine, the method comprising:

receiving, at an access control manager, a policy and one or more test requests, wherein the policy is associated with a user and comprises a new parameter, wherein the policy is an access policy that is unverified in a computing environment;

based on the policy and the one or more test requests, accessing, from the computing environment, contextual information for the policy and the one or more test requests, wherein the contextual information comprises one or more security groups and user profile parameters associated with the user;

accessing a set of policies comprising a live version of the policy, wherein the set of policies are an in-memory snapshot of a stored set of policies in a policy store associated with the computing environment, wherein the set of policies are an ordered sequence of condition-action rules that are evaluated in sequence to provide the user approved access to the computing environment;

applying the new parameter of the policy to the live version of the policy in the set of policies in the in-memory snapshot, wherein applying the new parameter via the in-memory snapshot precludes committing the new parameter of the policy to the stored set of policies in the policy store, evaluating the one or more test requests against the set of policies comprising the live version of the policy having the new parameter;

based on evaluating the live versions of the policy, generating policy verification results for the policy and the one or more test requests; and communicating the policy verification results.

16. The method of claim 15, wherein the test requests comprise parameters associated with parameters of the policy, wherein the contextual information for the test requests are determined based on the parameters.

17. The method of claim 15, wherein accessing the set of policies comprises snapshotting the set of policies from the policy store.

18. The method of claim 15, wherein the in-memory snapshot of the stored set of policies in a policy store supports precluding committing to the policy store the live version of the policy having the new parameter.

19. The method of claim 15, further comprising committing a first policy, wherein the first policy is not communicated with a test request; and simulating committing a second policy, wherein the second policy is communicated with a test request.

20. The method of claim 15, wherein the policy verification results include one of the following:

a first value to automatically deny the policy;

a second value to automatically approve the policy; and a third value to manually approve the policy.

* * * * *